June 26, 1956  R. W. AYLING  2,752,176
SEALS FOR ROTATING SHAFTS
Filed Feb. 4, 1953  2 Sheets-Sheet 1

INVENTOR.
Robert W. Ayling
BY Herman Seid
Atty.

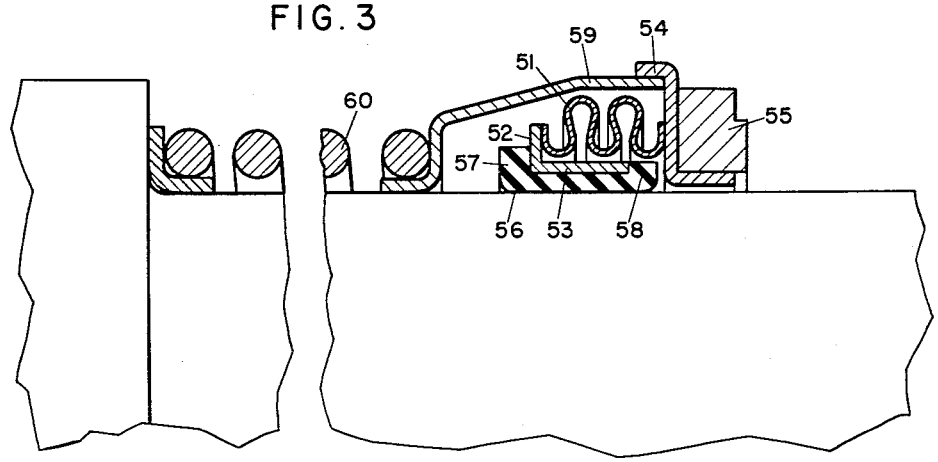
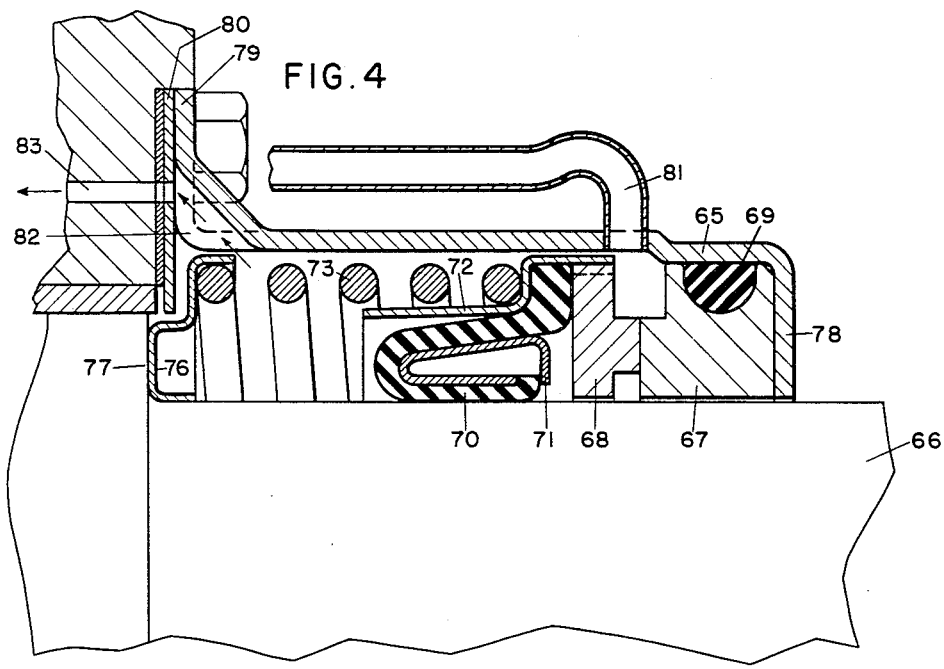

United States Patent Office 2,752,176
Patented June 26, 1956

2,752,176

SEALS FOR ROTATING SHAFTS

Robert W. Ayling, Utica, N. Y., assignor to Carrier Corporation, Syracuse, N. Y., a corporation of Delaware Application February 4, 1953, Serial No. 335,117

7 Claims. (Cl. 286—11)

This invention relates to a fluid seal and, more particularly, to a seal for use with a rotating shaft placed in a stationary housing to prevent leakage of fluids into or out of the housing.

The chief object of this invention is to provide a seal to prevent leakage of fluids into or out of a stationary housing containing a rotating shaft.

An object of the invention is to provide a flexible seal which seals against the shaft and against a stationary seat or seal member.

Another object is to provide a seal sub-assembly adapted to be positioned as a unit to seal the rotating shaft of a compressor or other similar structure. Other objects of my invention will be readily perceived from the following description.

This invention relates to a rotary seal for a shaft including a stationary seal member surrounding the shaft, a rotatable seal member surrounding the shaft and being adapted to engage the face of the stationary seal member, a flexible sealing sleeve disposed about the shaft and having a portion in sealing engagement with the shaft, means to hold the sealing portion of the sleeve against the shaft, and resilient means to urge the rotatable seal member into facial engagement with the stationary seal member.

The attached drawing illustrates a preferred embodiment of my invention, in which:

Figure 3 is a sectional view of another form of my seal; and

Figure 4 is a sectional view of my seal sub-assembly.

Figure 1:
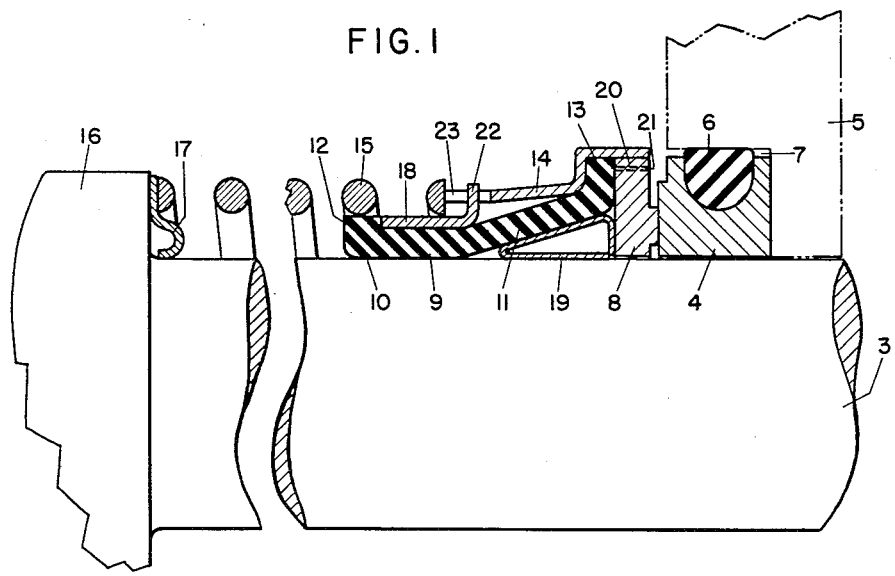
Figure 1 is a sectional view of an embodiment of my invention.

Referring to the drawings and particularly to Figure 1, there is disclosed a shaft 3 surrounded by an iron stationary seat or seal member 4. This seat member 4 is held against rotation and sealed in the seal-housing cover plate 5 by an O ring 6 having a maintained interference fit. Heat dissipation and squareness are obtained by allowing the seat to bottom solidly in the cover plate counterbore 7. It will be understood that the stationary seat member may be held in position and against rotation by other means if desired and the stationary seat may be integral with the cover plate, if desired.

Sealing between the rotating shaft 3 and the stationary seal housing is achieved by a carbon nose 8 running against the highly finished surface of the iron stationary seat member 4. This carbon nose will be referred to as the rotating seal member.

Sealing along the shaft 3 is accomplished by the synthetic elastic member or sleeve 9. This material is made resistant to the halogen refrigerants, ammonia, and oil. The synthetic material preferably is polymerized chloroprene or the copolymer of acrylic nitrile and butadiene. Any other synthetic material that is flexible and has similar resistant properties may be employed. The flexible member 9 comprises a cylindrical portion 10 that surrounds the shaft and is adapted to seal along the shaft. A conical portion 11 extends from the cylindrical portion 10 preferably at an angle of about 15°. A flange 12 is preferably at right angles to the cylindrical portion 10. Another flange 13, parallel to flange 12, extends from the end of the conical portion 11. The purposes of these flanges will be described hereinafter.

The flange 13 of the flexible member or sleeve 9 is clamped or held against the back of the rotating seal member 8 by a shell 14. Spring 15 forces shell 14 toward member 8 thereby compressing flange 13 of the elastic member therebetween to seal securely the space between members 8 and 14. This spring is confined between the end of the shell 14 and the shaft shoulder 16, where it is centered by the spring rest 17. If a shorter overall length of the seal is desired, the spring rest 17 may be extended and the spring confined between the shoulder of the shell and the extension of the spring rest.

The shell 14 comprises a section against the end of which the spring 15 bears. A second part of the shell, which is at approximately a right angle to the first section, bears against the flange 13. A third part, preferably at right angles to the second part, contains the driving means, to be described hereinafter, for the rotating seal member 8.

The flexible member or sleeve 9 is clamped or held against the shaft 3 by a tight-fitting collar 18 to seal the space between the shaft and the sleeve. End motion of the shaft within the seal housing is accommodated by putting the conical portion 11 of the elastic member in tension or compression. Binding on the shaft 3 of this member or sleeve 9 is prevented by the tapered ferrule member 19, which supports the elastic sleeve 9 in such a way as to prevent it from being damaged by high pressure. This ferrule member is triangular in cross-section. One part of the ferrule is cylindrical and surrounds the shaft. A second part is conical and is the part that supports the conical portion 11 of sleeve 9. The third part is a circular disk that rides against the seal member 8. The flange 12 is utilized to prevent the end of the elastic sleeve 9 from sliding out from under the collar 18 during installation and operation.

Driving of the rotating seal member 8 is accomplished by two protrusions 20 at 180° in the inside diameter of the shell 14 which fit into matching indentations 21 in the outside diameter of the rotating seal member 8. The shell 14 in turn is driven by upstanding lugs 22 on the collar 18 which fit in slots 23 in the end of the shell. These slots are proportioned to allow for end motion of the shaft. If desired, other suitable connecting means allowing for the end motion of the shaft may be employed.

Figure 2:
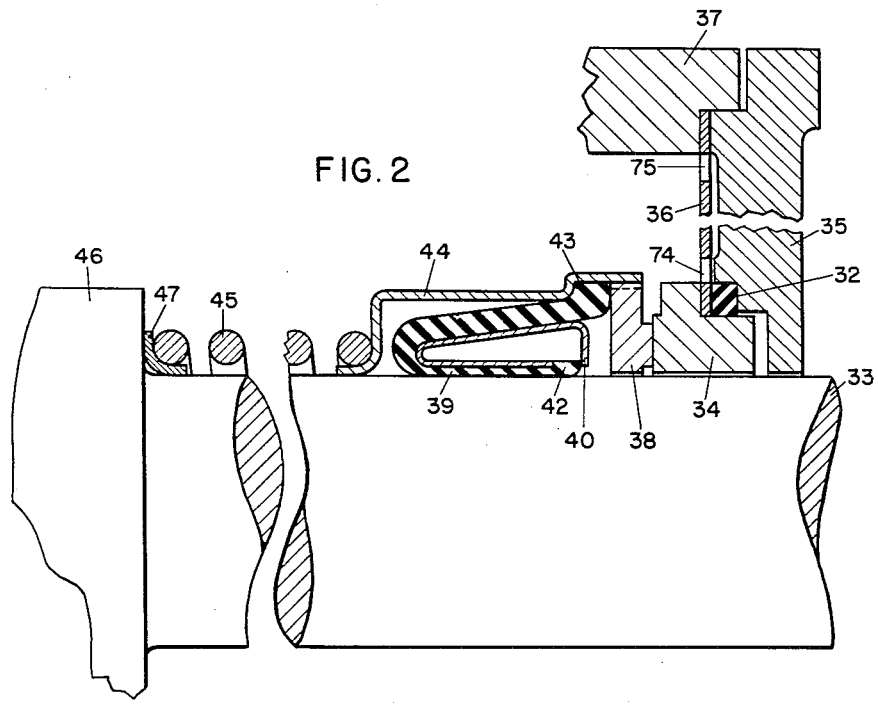
Figure 2 is a sectional view of a modification of my invention.

Referring to Figure 2, there is disclosed a modified seal assembly. An iron stationary seat or seal member 34 having a highly finished surface surrounds shaft 33. A disk 36 is clamped between the cover plate 35 and the seal housing 37 and acts as a gasket. This annular disk 36 is made of soft metal and is pressed against the stationary seat member 34. This disk, by virtue of the metal-to-metal contacts, provides a path for heat dissipation for the stationary seat member. The stationary seat member is held against rotation by both the disk 36 and the seat gasket 32. This confined gasket seals the seat in the cover plate by means of an interference fit. The disk 36 is provided with drainage holes 74 and pressure equalizing holes 75. Each set of holes is spaced circumferentially around the disk.

In Figure 2, there is disclosed a rotating seal member 38 which seals against the stationary seat member 34 and is driven by the same system of protrusions and indentations as used in the modification of Figure 1. A synthetic elastic member or sleeve 39 is employed to seal along the shaft. This flexible member 39 comprises a cylindrical portion that surrounds the shaft. A second portion of the member is conical and is so formed by collar 40, which will be described in detail hereinafter. A flange 42, which is a circular disk, extends from the cylindrical portion preferably at right angles thereto. A second flange 43, in a plane parallel to the plane of flange 42, extends from the conical portion.

A collar 40 serves the dual purpose of clamping or holding the cylindrical portion of the flexible member 39 tightly against the shaft 33 to seal along the shaft and to support the conical portion of the flexible sleeve against damage by pressure. The collar 40 consists of a cylindrical portion that is disposed between flange 42 and the portion of the flexible member 39 that is turned back to form the conical portion. A second part of the collar is conical and this part functions as a support for the conical portion of the sleeve 39. A third part of the collar is a circular disk to retain the flange 42 between the two parts of the collar.

The flange 43 is clamped against the back of the rotating seal member 38 by the shell 44. Spring 45 forces shell 44 toward member 38 thereby compressing flange 43 of sleeve 39 therebetween to seal securely the space between members 38 and 44. This spring is confined between the shell 44 and the shaft shoulder 46, where it is centered by the spring rest 47.

The shell 44 includes a cylindrical portion surrounding the shaft and a part at right angles thereto against which the spring 45 bears. This part is connected by another cylindrical portion to the section of the shell that bears against flange 43. Another cylindrical portion extends from this section to form the driving means, to be described hereinafter, for the rotating seal member 38.

End motion of the shaft 33 within the seal housing is accommodated by putting the conical portion of the flexible sleeve 39 in compression or tension. This sleeve 39 thus accomplishes sealing along the shaft and against the back of the rotating member 38.

Referring to Figure 3, a rotating seal nose assembly with a metallic bellows 51 to accommodate end play is shown. This bellows is to be soldered to the upstanding flange 52 on the collar 53 and to the back of the nose ring 54. The rotating seal member 55 is to be soldered to the front face of the nose ring 54. This seal nose and rotating seal member assembly could be fabricated from metal in one piece, if desired.

A seal is formed along the shaft by the clamping or compressing action of the collar 53 on the cylindrical portion of a synthetic member or sleeve 56. This sleeve has flanges 57 and 58 at opposite ends thereof extending from the cylindrical portion at right angles thereto to prevent the collar from riding over the sleeve when the seal is installed or removed.

A shell 59 has a tight slip fit inside of the flange of the nose ring 54. If desired, protrusions and indentations may be provided in the shell and nose ring to permit driving of the nose ring by the shell. This shell has a cylindrical portion that surrounds the shaft and a circular section extends therefrom at right angles. A spring 60, only a portion of which is shown, acts against this section. A conical portion extends from the circular section and this changes to a cylindrical portion, the end of which bears against the nose ring 54. Thus, the spring 60, which is mounted in the same manner as springs 15 and 45 in Figures 1 and 2, respectively, transmits its force through the shell 59 to urge the rotating seal member 55 against the stationary member 34.

A seal is formed along the shaft by the sleeve 56. Instead of the sealing by a flange of the sleeve against the rotating seal member, as in Figures 1 and 2, the bellows 51 is soldered to the nose ring 54 to form the seal.

In Figure 3, seal member 55 is driven by nose ring 54 attached to bellows 51. Thus, the rotation of the sleeve 56 imparts rotation through bellows 51 and ring 54 to member 55.

It will be understood that any of the three rotating seal assemblies may be used with either one of the two stationary seal assemblies described.

Referring to Figure 4, there is disclosed a seal cartridge 65 attached to a compressor. A seal is disposed within the cartridge to form a unitary assembly.

The seal is shown surrounding a shaft 66 but it is understood that the shaft is not a part of the unitary assembly. The seal includes a stationary seat or seal member 67 against which a rotating seal member 68 is in facial engagement. An O ring 69 is disposed in a groove in the stationary member 67 to seal the stationary member in the cartridge.

A synthetic sleeve or member 70 surrounds the shaft and is of the same shape as the sleeve 39 of Figure 2. A collar 71 of the same shape as the collar 40 of Figure 2 is employed to hold the cylindrical portion of the sleeve tightly against the shaft and to support the conical portion of the sleeve against damage by pressure.

A shell 72 is employed to drive the rotating member 68 in the same manner as Figure 2. However, this shell is constructed differently than the shell of Figure 20. This shell consists of a cylindrical portion that drives the member 68 and a circular section at right angles thereto. This section not only urges the flange of sleeve 70 against the member 68 but also has a spring 73 acting directly thereagainst. Another cylindrical portion extends from the circular section to protect the sleeve from the spring.

A spring rest 76 extends from the shaft adjacent its shoulder 77. This particular construction of the shell and the spring rest permits a shorter seal than in the other modifications.

The sealed cartridge 65 comprises a seal receptacle 78. This receptacle is preferably a deep-drawn cup with a bolting flange 79. After insertion of the seal parts, a closure ring 80 is continuously joined to the bolting flange 79 to retain the seal parts during handling of the seal cartridge.

Lubrication at the point of sealing between the rotating and stationary members can easily be accomplished by means of the oil line 81. This oil line may be soldered into the flange 79 in alignment with a passage in the crankcase supplying oil from the compressor lubricating system. Oil return to the crankcase may be accomplished by the boss 82 shown on the receptacle and a drilled passage 83 in the crankcase wall.

The present invention has the advantage of providing a seal that will accommodate end motion of a shaft by being placed in either compression or tension. Another advantage of this invention is that the flexible sleeve will not tear or be cut by contiguous metal parts. Another feature is that the stationary seat member possesses unique features concerned with, for example, heat dissipation and squareness. This stationary seat member serves as an O ring seat with a maintained interference fit.

While I have described a preferred embodiment of my invention, it will be understood that my invention is not limited thereto since it may be otherwise embodied within the scope of the following claims.

I claim:

1. A rotary seal for a shaft comprising a stationary seal member surrounding the shaft, a rotatable seal member in sealing engagement with the stationary seal member, a resilient sleeve member including a first portion thereof in sealing engagement with the shaft, a second portion having a generally conical shape and a third portion constituting a flanged section, means for resiliently urging said third portion of the sleeve into sealing contact with the rotatable seal member, an annular spacer member having a substantially triangular cross section disposed about the shaft and being in substantially continuous surface contact with the second portion of the sleeve member whereby axial movement in the seal is taken up in said second portion of the sleeve by the elasticity of the material without substantial change in the geometry of the sleeve member.

2. A rotary seal for a shaft comprising a stationary seal member surrounding the shaft, a rotatable seal member in sealing engagement with the stationary seal member, a resilient sleeve member including a first portion in sealing engagement with the shaft, a second portion having a generally conical shape and a third portion constituting a flanged section, a shell enveloping the rotating seal member and the sleeve, said shell member having a shoulder which engages the flanged section of the sleeve, means biasing said shell whereby said shoulder urges said flanged section of the sleeve into sealing engagement with the rotatable seal member, an annular member having a substantially triangular cross-section disposed about the shaft and in substantially continuous contact with a substantial part of the second portion of the sleeve member thereby supporting said portion of the sleeve member and protecting it from high pressures, said second portion of the sleeve member being further adapted to accommodate axial movement of the rotating seal member by its elasticity which flexes the material without a substantial change of the geometry of the sleeve member.

3. A rotary seal according to claim 1 in which the annular spacer member is directly mounted upon the shaft.

4. A rotary seal according to claim 1 in which the annular spacer member is mounted upon the first portion of the resilient sleeve member.

5. A rotary seal according to claim 1 in which the second portion of the resilient sleeve member radially envelopes the first portion of the resilient sleeve member.

6. A rotary seal according to claim 1 in which the annular spacer member is disposed between the first and second portions of the resilient sleeve member.

7. A rotary seal according to claim 6 further comprising a cartridge member, said cartridge member fully enveloping said seal and having secured thereto the stationary seal member.

References Cited in the file of this patent

UNITED STATES PATENTS

| | | |
|---|---|---|
| 2,360,372 | Snyder | Oct. 17, 1944 |
| 2,365,351 | Matter | Dec. 19, 1944 |
| 2,425,209 | Snyder et al. | Aug. 5, 1947 |
| 2,432,684 | Roshong | Dec. 16, 1947 |
| 2,508,097 | Brown | May 16, 1950 |

FOREIGN PATENTS

| | | |
|---|---|---|
| 653,939 | Great Britain | May 30, 1951 |